United States Patent Office 3,514,353

Patented May 26, 1970

3,514,353

PROCESS FOR PAPER OVERLAY

Alfred Shaines, Fanwood, N.J., assignor to American Standard Inc., a corporation of Delaware No Drawing. Filed Jan. 8, 1965, Ser. No. 424,189
Int. Cl. B29b *1/00*
U.S. Cl. 156—242 11 Claims

ABSTRACT OF THE DISCLOSURE

Sheet material such as paper is bonded to a wood substrate by impregnating the sheet material and applying pressure up to about 3,000 lbs. per square inch, a temperature up to 300° F. The substrate can be wood particles impregnated with ammonia, whereby a single compression step can serve to bond the wood particles together and bond the sheet material to the wood.

This invention relates to processes for forming on objects of wood, particularly objects of pressed wood, an overlay of a cellulosic material, and to articles produced by such processes.

For brevity and clarity, whenever the word "wood" is used hereafter in this description, it is understood that included in this usage is any cellulosic and ligno-cellulosic material either in its natural state or modified by the inclusion of resins or by other physical and chemical treatments. The cellulosic materials include substances such as, for example, flour and starch; and the ligno-cellulosic materials include natural constituents of trees and plants.

Particles of cellulosic material, and in particular, ligno-cellulosic material, such as, for example, woodflour, have been formed into objects of desired shape by blending with said particles a powdered resin, such as a melamine formaldehyde resin, and compressing the mixture of resin and cellulosic material at high temperature in a mold of selected shape. If desired, the mixture can be compressed between sheets of paper which have been similarly impregnated with a resin. The paper may be plain or decorative. Use is made of melamine or other types of resin impregnated papers in the preparation of decorative laminates such as Formica and in the production of melamine dinnerware. Melamine impregnated papers used for decorative purposes are, however, relatively brittle and are difficult or sometimes impossible to mold into intricate contours and shapes.

A novel process for forming objects of pressed wood without the use of resins has been described in U.S. patent application Ser. No. 386,422 filed July 30, 1964 and now abandoned. In this process wood particles are soaked in liquid ammonia and then compressed in a mold to produce objects having great strength, hardness, and density. However, this process of itself produces a surface, the color, design and texture of which are limited to those of the ligno-cellulosic materials, and any coloring matter which may have been added, which may have been compressed and bonded together. The process is not suitable for preparing objects of highly smooth surfaces having thereon printed matter, decorations or designs.

My invention provides a process for bonding a decorative paper overlay to objects of pressed and other kinds of wood to provide such objects with a highly smooth, hard, durable decorative surface.

In accordance with my invention, I impregnate a sheet of paper with liquid ammonia and then apply this sheet by compression to wood. The treatment of the paper with liquid ammonia renders the paper readily bondable to the wood when the paper and wood are compressed.

The processes of my invention do not require the use of a resin to bond the paper as is required by other processes used in the preparation of objects having paper overlays. This is of distinct advantage since the ammonia is not only considerably less expensive than the resins but may also be readily recovered.

While my invention is useful in applying a paper overlay to previously formed or molded wooden objects, such as an overlay for a decorative laminate, it is of particular value in forming wooden objects having a paper overlay in a single compression step.

In carrying out my invention the sheet of paper is soaked in liquid ammonia for about 1 to 15 minutes, preferably for about 10 minutes. The sheet is then applied to wood particles which have been treated to render them bondable when compressed. The combination of the sheet and the wood particles is then compressed in a mold of desired shape at pressures ranging up to about 3,000 lbs./sq. in., preferably about 2,500 lbs./sq. in. at temperatures ranging up to about 300° F., preferably at about 250° F. The pressure is maintained until most of the ammonia has evaporated. It is advantageous to release momentarily the pressure on the mold one or more times to permit escape of the ammonia or to provide a mold wherein the ammonia can escape during the compression. Sufficient ammonia escapes within from about 1 to 10 minutes, at which time the pressure and temperature are reduced and the object removed from the mold. However, longer exposures to the high pressures and temperatures are not detrimental to the process.

In forming the molded objects the wood particles are treated with ammonia to render them bondable when compressed. However, the process is not limited to the use of wood particles which have been so treated, but can be used with the conventional woodflour-resin mixtures.

While ordinary paper such as, for example, kraft or plain bond is preferred in my process, cellulosic material such as, for example, cellophane or cotton cloth may also be used.

Other agents may be added to the paper to impart additional desirable properties thereto. For example, an agent which imparts water resistance to the object is desirably added prior to soaking in ammonia. Zinc stearate is very satisfactory for this purpose. Coloring agents and flame retardant agents may also be added to obtain products of desired hues, and, where desired, the paper may have thereon a decoration, design, or printing.

The invention will be more fully understood from the examples which follow.

(I) TO PREPARE A TOILET SEAT

Zinc stearate in an amount of about 0.66% of the weight of the woodflour was added to and mixed with woodflour. The mixture of woodflour and zinc stearate was then soaked in liquid ammonia for about 8 minutes, after which the ammonia was decanted. The mixture of woodflour and zinc stearate was placed in a toilet seat mold, and a sheet of paper with a floral design which had been soaked in liquid ammonia containing 1% by weight of zinc stearate, for 10 minutes was applied to the woodflour zinc stearate mixture. The combination of paper, woodflour and zinc stearate was pressurized in the mold at about 2,500 lbs./sq. in. at a temperature of about 250° F. After about 3 minutes the pressure was momentarily released. The pressure and heat were maintained for 7 more minutes after which the finished toilet seat was removed from the mold.

(II) TO PREPARE A TOILET SEAT

The procedure of Example I was repeated with the exception that a mixture of woodflour, a melamine-formaldehyde resin, and zinc stearate was used in place of woodflour treated with liquid ammonia.

(III) TO PREPARE A DECORATIVE MAP PANEL

A colored 4′ by 6′ colored map on kraft paper was soaked in liquid ammonia for about 8 minutes. The map was then placed on a 4′ by 6′ wood panel and the combination of map and wood panel compressed at about 3,000 lbs./sq. in. at about 240° F. for about 8 minutes, after which the panel was removed.

(IV) TO PREPARE A DECORATIVE MAP PANEL

The procedure of Example III was repeated except that the wood panel was obtained from a pressed wood board which had been formed by molding ammonia soaked woodflour as described in U.S. patent application Ser. No. 386,422 filed July 30, 1964.

(V) TO PREPARE A DIPLOMA PANEL

A 10″ by 16″ diploma was soaked in liquid ammonia for about 10 minutes. The paper was then applied to a cedar board 12″ by 20″ by ¼″ which had also been soaked in liquid ammonia for 10 minutes. The combination of diploma and cedar board was compressed at about 2,500 lbs./sq. in. at about 250° F. for 4 minutes, at which time the pressure was momentarily released. The compression was continued for another 6 minutes, after which the panel was removed.

(VI) TO PREPARE A DIPLOMA PANEL

The procedure of Example V was repeated except that in place of the cedar board a pressed wood board which had been molded from resin and woodflour was used.

(VII) TO PREPARE A DECORATIVE TABLE TOP

Sawdust was mixed with 1% its weight of zinc stearate, the mixture soaked in liquid ammonia for about 10 minutes, and the excess ammonia then decanted. The mixture was placed in a mold shaped to form a table top, and a sheet of paper having thereon a colored decorative design, which sheet had been soaked in liquid ammonia containing 1% by weight zinc stearate for 10 minutes, was placed on top of the shaped sawdust zinc stearate mixture. The combination of paper, sawdust and zinc stearate subject to a pressure of about 2,600 lbs. sq. in. at a temperature of about 250° F. for 3 minutes at which time the pressure was momentarily released. The compression and heating were then continued for 5 more minutes, and after cooling, the table top was removed from the mold.

In a similar manner other useful articles of pressed wood such as ash trays, platters, trays, and other utilitarian and decorative objects were also prepared.

The processes and examples set forth above are by way of illustration only, and it is to be understood that it is hereby intended to cover all changes and modifications of the conditions herein which do not constitute departures from the spirit of the invention.

What is claimed is:

1. A process for forming an overlay of a cellulosic material on a wood object which comprises impregnating a sheet of cellulosic material with liquid ammonia, applying the impregnated sheet to a wood object, subjecting the combination of the sheet and wood object to a pressure up to about 3,000 lbs./sq. in.

2. A process for forming an overlay of a cellulosic material on a wood object which comprises impregnating a sheet of cellulosic material with liquid ammonia, applying the impregnated sheet to a wood object, subjecting the combination of the sheet and the wood object to a pressure of about 2,500 lbs./sq. in. and a temperature up to about 300° F.

3. A process for forming an overlay of a cellulosic sheet on a wood object which comprises impregnating a sheet of cellulosic material with liquid ammonia, impregnating a wood object with liquid ammonia, applying the impregnated sheet to the wood object, and subjecting the sheet and wood object to a pressure up to about 3,000 lbs./sq. in.

4. A process for forming an overlay of paper on a wood object which comprises impregnating a sheet of paper with liquid ammonia, impregnating a wood object with liquid ammonia, applying the impregnated sheet to the impregnated wood object, subjecting the combination of the sheet and the wood object to a pressure of about 2,500 lbs./sq. in. and a temperature of about 300° F.

5. A process for forming an overlay of paper on a wood object, said paper having thereon printed material, which comprises impregnating a sheet of said paper with liquid ammonia, applying the impregnated sheet to a wood form, subjecting the combination of the sheet and the wood form to a pressure of about 2,600 lbs./sq. in. and a temperature of about 250° F.

6. A process for producing a decorative toilet seat of pressed wood having thereon a decorative overlay of paper which comprises impregnating a sheet of paper having thereon a floral design with liquid ammonia containing 1% by weight of zinc stearate, impregnating with liquid ammonia a mixture of woodflour containing 0.66% by weight of zinc stearate, inserting the mixture of impregnated woodflour and zinc stearate into a mold shaped in the form of a toilet seat, applying the impregnated sheet to the mixture of woodflour and zinc stearate, and subjecting the combination in the mold of the sheet, woodflour and zinc stearate to a pressure of about 2,500 lbs./sq. in. and a temperature of about 300° F. for a period of about 10 minutes.

7. A process for preparing a decorative table top of pressed wood having thereon a decorative overlay of paper which comprises impregnating a sheet of paper having a colored decorative design with liquid ammonia containing 1% by weight of zinc stearate, impregnating with liquid ammonia a mixture of sawdust containing 1% by weight of zinc stearate, inserting the mixture of impregnated sawdust and zinc stearate into a mold shaped in the form of a table top, applying the impregnated sheet to the mixture of sawdust and zinc stearate, and subjecting the combination in the mold of the sheet, sawdust and zinc stearate to a pressure of about 2,600 lbs./sq. in. and a temperature of about 250° F. for about 8 minutes.

8. A process for forming an article of pressed wood formed from wood particles having an overlay of a cellulosic material thereon, which comprises impregnating a sheet of cellulosic material with liquid ammonia, impregnating wood particles with liquid ammonia, inserting the impregnated wood particles into a mold of desired form, applying the impregnated sheet to said wood particles, and subjecting the combination in the mold of the sheet and the wood particles to a pressure up to about 3,000 lbs./sq. in.

9. A process for forming an article of pressed wood formed from wood particles having an overlay of a cellulosic material thereon, which comprises impregnating a sheet of paper with liquid ammonia, impregnating wood particles with liquid ammonia, inserting the impregnated wood particles into a mold of desired form, applying the impregnated sheet to said wood particles, and subjecting the combination in the mold of the sheet and the wood particles to a pressure up to about 3,000 lbs./sq. in. and a temperature up to about 350° F.

10. A process for forming an article of pressed wood formed from woodflour having an overlay of paper thereon, which comprises impregnating a sheet of paper with liquid ammonia, inserting a mixture of woodflour and a resin into a mold of desired shape, applying the impregnated sheet to the mixture of woodflour and resin, and subjecting the combination in the mold of the sheet, woodflour and resin to a pressure of about 2,500 lbs./sq. in. and a temperature of about 250° F.

11. A process for forming an article of pressed wood formed from woodflour having an overlay of paper thereon, which comprises impregnating a sheet of paper in liquid ammonia containing a material which imparts water resistance, impregnating a mixture of woodflour and a material which imparts water resistance in liquid ammonia, inserting the impregnated mixture of woodflour and the material which imparts water resistance into a mold of desired form, applying the impregnated sheet to the mixture of woodflour and the substance which imparts water resistance, and subjecting the combination in the mold of the sheet, the woodflour and the material which imparts water resistance to a pressure of about 2,500 lbs./sq. in. and a temperature of about 300° F.

References Cited

UNITED STATES PATENTS

| | | | |
|---|---|---|---|
| 2,013,611 | 9/1935 | Kaufmann | 161—268 |
| 2,247,205 | 6/1941 | Schorger et al. | 106—163 |
| 2,646,380 | 7/1953 | Barlow et al. | 161—413 |
| 2,968,573 | 1/1961 | Glab | 106—163 |
| 3,305,499 | 2/1967 | Bevans | 106—163 |

MORRIS SUSSMAN, Primary Examiner

U.S. Cl. X.R.

156—325; 161—268